April 10, 1934.  F. LANG  1,954,082
DIESEL ENGINE WITH AIR AND PRESSURE RESERVOIR
Filed Jan. 22, 1932  2 Sheets-Sheet 1
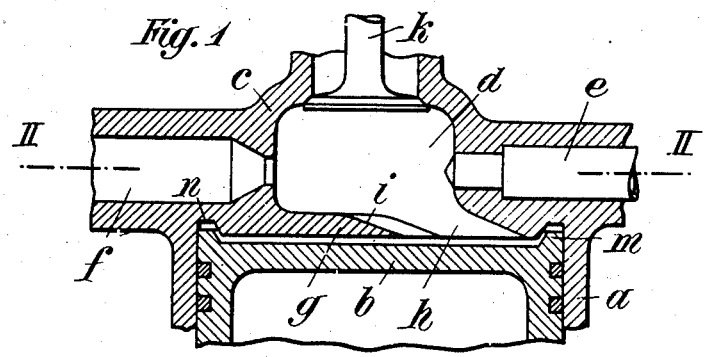
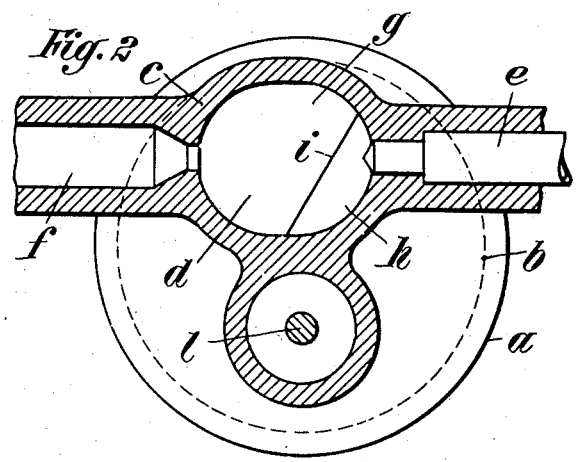
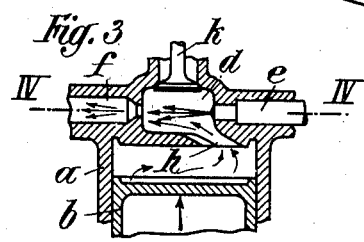
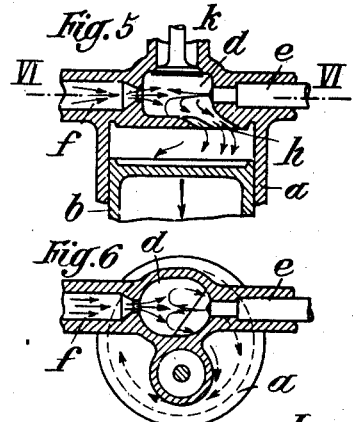
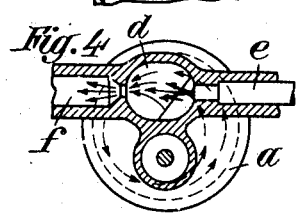
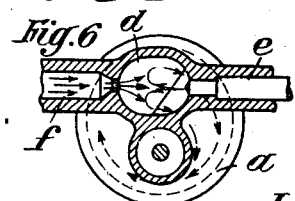
Inventor:
Franz Lang
Attorney April 10, 1934.    F. LANG    1,954,082
DIESEL ENGINE WITH AIR AND PRESSURE RESERVOIR
Filed Jan. 22, 1932    2 Sheets-Sheet 2
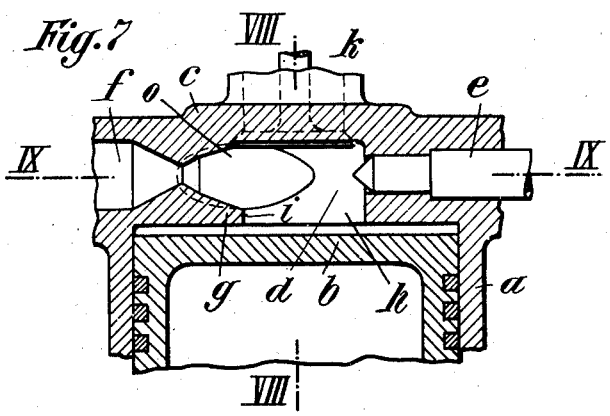
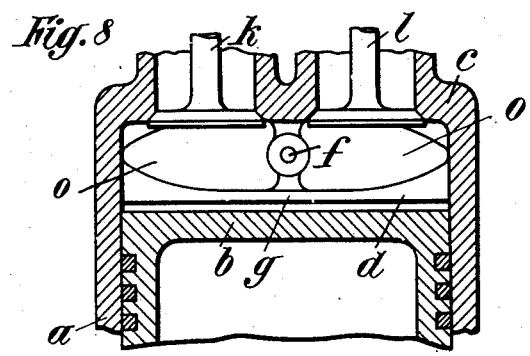
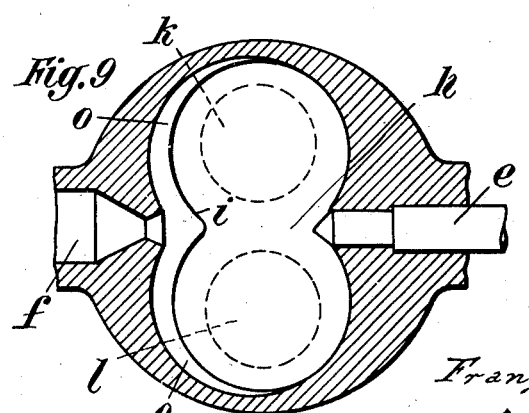
Inventor:
Franz Lang
By
Attorney.

Patented Apr. 10, 1934

1,954,082

UNITED STATES PATENT OFFICE 1,954,082

DIESEL ENGINE WITH AIR AND PRESSURE RESERVOIR

Franz Lang, Munich, Germany, assignor to Lanova Aktiengesellschaft, Vaduz, Liechtenstein Application January 22, 1932, Serial No. 588,210
In Germany January 24, 1931

10 Claims. (Cl. 123—32)

My invention relates to Diesel engines, and more particularly to engines having an air storage chamber or reservoir.

It is the object of my invention to improve the performance of an engine of this type.

To this end, in combination with a main combustion chamber connected to the cylinder of the engine, an air storage chamber at one side, and a fuel injection nozzle at the other side of the main combustion chamber, I provide a baffle between the main combustion chamber and the cylinder, which baffle extends toward the nozzle and across part of the main combustion chamber.

The improvement achieved by this arrangement is due to the fact that, during the charging of the air storage chamber and the injection of fuel, the air expelled from the cylinder and forced into the air storage chamber through the main combustion chamber and the fuel flow in the same direction, while during the discharge of air from the air storage chamber and the continued fuel injection, the air and the fuel flow in opposite directions.

In the accompanying drawings cylinder heads of engines having two distinct types of main combustion chambers are illustrated by way of example.

In the drawings

Fig. 1 is an axial section of a cylinder head with a main combustion chamber, in the top plate of which the air inlet valve of the engine is seated;

Fig. 2 is a section on the line II—II of Fig. 1;

Fig. 3 is a reproduction of Fig. 1, drawn to a smaller scale and showing the flow of air and fuel during the charging of the air storage chamber;

Fig. 4 is a section on the line IV—IV of Fig. 3;

Fig. 5 shows the flow of air and fuel during the discharging of the air storage chamber;

Fig. 6 is a section on the line VI—VI of Fig. 5;

Fig. 7 is an axial section of a cylinder head with a main combustion chamber, in the top plate of which the inlet and outlet valves of the engine are seated;

Fig. 8 is a section on the line VIII—VIII of Fig. 7, and

Fig. 9 is a section on the line IX—IX of Fig. 7.

Referring now to the drawings, $a$ is the cylinder, $b$ is the piston, $c$ is the cylinder head, $d$ is the main combustion chamber, $e$ is the fuel injection nozzle, and $f$ is the air storage chamber. The main combustion chamber $d$ is of smaller volume than the cylinder $a$ so that it is disposed inwardly at the cylinder and away from a portion of the wall thereof. The fuel nozzle $e$, the chamber $d$ and the air storage chamber $f$ are preferably arranged with a common axis or centre line which extends at right angles, or substantially so, to the axis of the cylinder $a$.

Preferably the main combustion chamber $d$ serves also as a valve chamber. In the example illustrated in Figs. 1 to 6, the inlet valve $k$ is seated in the top plate of the main combustion chamber $d$, and the outlet valve $l$ has a chamber of its own, while in the example illustrated in Figs. 7 to 9 the inlet and outlet valves $k$ and $l$ are seated in the top plate of the chamber.

Referring now to Figs. 1 to 6, $g$ is the baffle referred to, which extends from the side where the reservoir $f$ is connected to the chamber $d$, toward the side of the nozzle $e$, leaving open a slot $h$ between the cylinder $a$ and the chamber $d$. The baffle $g$ is preferably arranged at right angles to the axis of the cylinder $a$ and its edge, which may be sharpened so as to be inclined downward and inward of the cylinder as shown in Fig. 1, is inclined to the line connecting the reservoir $f$ and the nozzle $e$, as shown in Fig. 2. The main combustion chamber $d$, as also shown in Fig. 2, is preferably arranged eccentrically to the axis of the cylinder $a$, adjacent one side thereof, and slot $h$ is disposed so that the air and fuel mixture issuing from the combustion chamber is projected into the cylinder substantially tangentially thereof and is given a whirling movement in the cylinder, as indicated by the arrows in Fig. 6.

In operation, the inlet valve $k$ is opened during the suction stroke of the piston $b$ and fresh air is drawn into the main combustion chamber $d$. When the piston $b$ moves inwardly on the compression stroke as shown in Fig. 3, the air flows from the cylinder $a$ to the chamber $f$ through the slot $h$ and the combustion chamber $d$ in the direction indicated by the arrows in Fig. 3. Since slot $h$ is adjacent one side of the cylinder, air flowing to this slot from the cylinder travels substantially circumferentially of the cylinder, which imparts to the air in the cylinder a desirable whirling motion or rotary turbulence, as indicated in Fig. 4. During this period the injection from the nozzle $e$ occurs and the ejected fuel flows in the same direction as the air, it being noted that the air flowing to air storage chamber $f$ flows along the path of fuel injection so as to entrain the fuel and facilitate entry thereof into chamber $f$. On the expansion stroke of piston $b$ the air and fuel mixture, previously stored in chamber $f$ under high pressure, is discharged into the combustion chamber d at high velocity and in the opposite direction to the jet of fuel which still issues from the nozzle e, Fig. 5.

The described flows of the air and fuel mixture and the injected fuel assure intimate mixing of the air and fuel, while producing high turbulence of the fuel mixture in the cylinder resulting in increased smoothness and efficiency in operation of the engine.

The piston b may be equipped with a circular rib m of any desired section, for instance, rectangular, triangular etc., which at the upper dead centre position of the piston b, Fig. 1, enters a groove n in the cylinder head. The groove forms an extension of the cylinder into the cylinder head which extension prevents discharge of crude oil from the main combustion chamber d against the cylinder wall.

Referring now to Figs. 7 to 9, the members are arranged substantially in the manner described with reference to Figs. 1 to 6, but the main combustion chamber d, viewed in plan, is shaped like the figure 8 and the two valves k and l are located in the top plate. The baffle g has the shape of two crescents as shown in Fig. 9, and the point where the crescents meet is opposite the nozzle e, where the slot h has its smallest section, as in Fig. 7. o is a channel connected with the chamber f, with the opening of this chamber at its centre. The baffle g is the lower wall of the channel o while its upper wall merges into the top plate of the main combustion chamber d.

The operation of this type of engine is the same as that described with reference to Figs. 1 to 6, but in view of the particular shape of the main combustion chamber d and the corresponding double-crescent shape of the channel o, with its centre opposite the nozzle e where the edge i is nearest the nozzle, a whirling movement in opposite directions is imparted to the mixture flowing through the main combustion chamber which movement is assisted by the baffle.

In the operation of the engine of Figs. 7 to 9, inclusive, during the compression stroke air is forced from the cylinder into the combustion chamber, and thence into the air storage chamber. As the piston approaches its upper dead center position, fuel is injected by nozzle e, and a certain amount of this fuel enters chamber f where it is stored with the air in this chamber under high pressure. Combustion occurs shortly thereafter, and the piston moves downwardly on its expansion or working stroke. The injection of fuel continues during a predetermined portion of the downward travel of the piston, as is known in the art. The downward travel of the piston lowers the pressure in the combustion chamber, and a stream of air and fuel mixture is ejected from chamber f toward nozzle e. This stream of air and fuel meets the heavier stream of injected fuel at a point adjacent the orifice of chamber f, with the result that the air and the fuel are deflected away from the central restricted portion of the combustion chamber and flow about the curved walls of this chamber along the channels o. The fuel and air mixture is thus separated into two masses, traveling in opposite directions along the curved walls of combustion chamber d, each of which masses is caused to whirl at high speed. In this manner, high rotary turbulence is imparted to the air and fuel mixture, which assures thorough intermixing of the air and the fuel with resulting increase in smoothness and efficiency in the operation of the engine.

Obviously the piston b, which has a plain top in Figs. 7, 8 and 9, may be equipped with the circular rib m shown in Fig. 1.

It is not necessary that the main combustion chamber should be shaped like an 8 as illustrated. It is only important that the baffle g extend toward opposite sides of the chamber d from the opening of the air storage chamber and that the edge i of the baffle be shaped correspondingly to the shape of the chamber d. In this manner channel o is formed, the lower wall of which is the baffle g and the upper wall of which is the top plate of the chamber d. I am not, therefore, limited to the crescent shape of the baffle g and the channel o, nor is it necessary that the channel extend for substantially half the perimeter of the main combustion chamber, as shown in Fig. 9.

I claim:

1. In combination in an injection engine, a cylinder and a piston operating therein, a combustion chamber overlying and opening into the cylinder, an air storage chamber opening into the combustion chamber at one side thereof and otherwise closed to the cylinder, an injection nozzle opening into the combustion chamber at the opposite side thereof, and a baffle between the combustion chamber and the cylinder and substantially normal to the cylinder axis, said baffle extending from one side of the combustion chamber and terminating short of the other side thereof and defining with the latter a restricted opening between said combustion chamber and the cylinder.

2. In combination in an injection engine, a cylinder and a piston operating therein, a combustion chamber overlying and opening into the cylinder, an air storage chamber opening into the combustion chamber at one side thereof and otherwise closed to the cylinder, an injection nozzle opening into the combustion chamber at the opposite side thereof, the combustion chamber having an air inlet passage opening through its roof, an overhead valve controlling said passage, and a baffle between the combustion chamber and the cylinder and substantially normal to the cylinder axis, said baffle extending from one side of the combustion chamber and terminating short of the other side thereof and defining with the latter a restricted opening between said combustion chamber and the cylinder.

3. In combination in an injection engine, a cylinder and a piston operating therein, a combustion chamber overlying and opening into the cylinder, an air storage chamber opening into the combustion chamber at one side thereof and otherwise closed to the cylinder, an injection nozzle opening into the combustion chamber at the opposite side thereof, the combustion chamber having air inlet and burnt gas outlet passages opening through its roof, overhead valves controlling said passages, and a baffle between the combustion chamber and the cylinder and substantially normal to the cylinder axis, said baffle extending from one side of the combustion chamber and terminating short of the other side thereof and defining with the latter a restricted opening between said combustion chamber and the cylinder.

4. In combination in an injection engine, a cylinder and a piston operating therein, a combustion chamber overlying and opening into the cylinder, the walls of said chamber being curved in a plane normal to the cylinder axis, an air storage chamber opening into the combustion chamber at one side thereof and otherwise closed to the cylinder, an injection nozzle opening into the combustion chamber at the other side thereof, and a baffle between the cylinder and the combustion chamber, said baffle extending from the air storage chamber side of the combustion chamber and terminating short of the injection nozzle opening.

5. In combination in an injection engine, a cylinder and a piston operating therein, a combustion chamber overlying and opening into the cylinder, said chamber being of approximately figure 8 shape in a plane normal to the cylinder axis, an air storage chamber opening into the constriction of the combustion chamber at one side thereof, and an injection nozzle opening into the constriction of the combustion chamber at the opposite side thereof.

6. In combination in an injection engine, a cylinder and a piston operating therein, a combustion chamber overlying and opening into the cylinder, an air storage chamber opening into the combustion chamber at one side thereof, and an injection nozzle opening into the combustion chamber at the opposite side thereof, the opening between the combustion chamber and the cylinder being disposed to discharge fuel mixture from the combustion chamber into the cylinder substantially tangentially of the latter.

7. In a Diesel engine, a cylinder, a combustion chamber, an air storage chamber opening into the combustion chamber at one side thereof, a fuel injection nozzle opening into the combustion chamber at the opposite side thereof, and a baffle between said combustion chamber and said cylinder, said baffle extending from the air storage chamber side of the combustion chamber and terminating short of the injection nozzle opening, the edge of the baffle adjacent the injection nozzle opening being inclined transversely of said combustion chamber and defining with the adjacent wall thereof an opening into the cylinder.

8. In a Diesel engine, a cylinder, a combustion chamber, an air storage chamber opening into the combustion chamber at one side thereof, a fuel injection nozzle opening into the combustion chamber at the opposite side thereof, and a baffle between said combustion chamber and said cylinder, said baffle extending from the air storage chamber side of the combustion chamber and terminating short of the injection nozzle opening, the opening from the air storage chamber being disposed centrally of one side of the combustion chamber and the nozzle opening being disposed centrally of the opposite side of the combustion chamber, said combustion chamber being curved in a plane normal to the cylinder axis and having walls of regular curvature extending in opposite directions from the nozzle and the air storage chamber openings, respectively.

9. In a Diesel engine, a cylinder, a combustion chamber connected to said cylinder and of approximately figure 8 shape in plan, an air storage chamber opening into the combustion chamber at one side of the constriction thereof, a fuel injection nozzle opening into the combustion chamber at the opposite side of the constriction thereof, and a baffle between said combustion chamber and said cylinder, said baffle extending from the side of the combustion chamber through which said air storage chamber opens and approximately conforming in shape in plan to the shape in plan of the wall of the combustion chamber at the side thereof through which said air storage chamber opens.

10. In a Diesel engine, a cylinder, a combustion chamber, an air storage chamber opening into the combustion chamber at one side thereof and otherwise closed to the cylinder, a fuel injection nozzle opening into the combustion chamber at the opposite side thereof, and a baffle between said combustion chamber and said cylinder, said baffle extending from the side of the combustion chamber through which the air storage chamber opens and terminating short of said opposite side of said combustion chamber.

FRANZ LANG.